(12) United States Patent
Niwa et al.

(10) Patent No.: US 11,554,805 B2
(45) Date of Patent: Jan. 17, 2023

(54) VEHICLE CONTROL APPARATUS

(71) Applicant: JTEKT CORPORATION, Osaka (JP)

(72) Inventors: Tomohiro Niwa, Okazaki (JP); Satoru Mikamo, Okazaki (JP); Masashi Fuji, Toyota (JP)

(73) Assignee: JTEKT CORPORATION, Osaka (JP)

( * ) Notice: Subject to any disclaimer, the term of this patent is extended or adjusted under 35 U.S.C. 154(b) by 441 days.

(21) Appl. No.: 16/531,379

(22) Filed: Aug. 5, 2019

(65) Prior Publication Data
US 2020/0047791 A1 Feb. 13, 2020

(30) Foreign Application Priority Data
Aug. 9, 2018 (JP) .............................. JP2018-150359

(51) Int. Cl.
| | | |
|---|---|---|
| *B62D 5/04* | (2006.01) | |
| *B62D 5/00* | (2006.01) | |
| *H02P 25/22* | (2006.01) | |

(52) U.S. Cl.
CPC ........... *B62D 5/0403* (2013.01); *B62D 5/005* (2013.01); *B62D 5/0463* (2013.01); *B62D 5/0493* (2013.01); *H02P 25/22* (2013.01); *B62D 5/0484* (2013.01)

(58) Field of Classification Search
CPC .... B62D 5/005; B62D 5/0463; B62D 5/0493; B62D 5/0484
See application file for complete search history.

(56) References Cited

U.S. PATENT DOCUMENTS

| | | | | |
|---|---|---|---|---|
| 10,903,777 | B2 * | 1/2021 | Niwa .................. | B62D 5/0484 |
| 2005/0159866 | A1 * | 7/2005 | Takeuchi ............. | B62D 5/003 |
| | | | | 701/41 |
| 2018/0208236 | A1 * | 7/2018 | Asao ................... | H02P 29/0241 |

(Continued)

FOREIGN PATENT DOCUMENTS

| | | | | |
|---|---|---|---|---|
| EP | 1512609 | A1 | 3/2005 | |
| EP | 3035523 | A1 * | 6/2016 | .......... H02H 7/0844 |

(Continued)

OTHER PUBLICATIONS

Mar. 23, 2020 Extended European Search Report issued in European Patent Application No. 19190576.9.
(Continued)

*Primary Examiner* — Jacob D Knutson
(74) *Attorney, Agent, or Firm* — Oliff PLC

(57) ABSTRACT

An ECU independently controls power supply to two winding systems in a motor on a per-winding-system basis based on current command values each calculated for a corresponding winding system in accordance with a target assist torque. When a first winding system fails, the ECU transitions from a first state in which the ECU causes the winding groups of the two winding systems to produce the target assist torque to a second state in which the ECU causes the winding group of the other normal winding system to produce the target assist torque. If the current command value for the normal winding system is equal to or below a current threshold value that is set with reference to zero or a value close to zero when the failed winding system recovers to its normal state in the second state, the ECU transitions from the second state to the first state.

4 Claims, 8 Drawing Sheets

(56) References Cited

U.S. PATENT DOCUMENTS

2018/0237055 A1\*  8/2018  Keum ............... B60R 21/01532
2018/0237058 A1    8/2018  Furukawa et al.
2019/0144028 A1    5/2019  Taki et al.

FOREIGN PATENT DOCUMENTS

| EP | 3242393 A1 \* | 11/2017 | ........... B62D 5/0487 |
| EP | 3242393 A1 | 11/2017 | |
| JP | 2004-010024 A | 1/2004 | |
| JP | 2014091456 A \* | 5/2014 | |
| WO | 2017/064018 A1 | 4/2017 | |
| WO | 2017/068685 A1 | 4/2017 | |
| WO | WO-2017068685 A1 \* | 4/2017 | ........... B62D 5/0403 |
| WO | 2018/012417 A1 | 1/2018 | |
| WO | WO-2018012417 A1 \* | 1/2018 | ............. B60R 16/02 |

OTHER PUBLICATIONS

Apr. 26, 2022 Office Action issued in Japanese Patent Application No. 2018-150359.

\* cited by examiner

FIG.4

| STATE | ECU40 | FIRST MICROCOMPUTER 63 | SECOND MICROCOMPUTER 73 |
|---|---|---|---|
| $S_1$ | DUAL-WINDING-SYSTEM DRIVE | PERFORMING ASSIST CONTROL | PERFORMING ASSIST CONTROL |
| $S_2$ | SINGLE-WINDING-SYSTEM DRIVE | PERFORMING ASSIST CONTROL | DETECT ANOMALY (STOP ASSIST) |
| $S_3$ | SINGLE-WINDING-SYSTEM DRIVE | PERFORMING ASSIST CONTROL | DETECT RECOVERY TO NORMAL STATE (ASSIST-START STANDBY) |
| $S_4$ | DUAL-WINDING-SYSTEM DRIVE | PERFORMING ASSIST CONTROL | PERFORMING ASSIST CONTROL |

FIG. 7

| STATE | ECU40 | FIRST MICROCOMPUTER 63 | SECOND MICROCOMPUTER 73 |
|---|---|---|---|
| $S_1$ | DUAL-WINDING-SYSTEM DRIVE | PERFORMING ASSIST CONTROL | PERFORMING ASSIST CONTROL |
| $S_2$ | SINGLE-WINDING-SYSTEM DRIVE | PERFORMING ASSIST CONTROL | DETECT ANOMALY (STOP ASSIST) |
| $S_3$ | SINGLE-WINDING-SYSTEM DRIVE | PERFORMING ASSIST CONTROL | DETECT RECOVERY TO NORMAL STATE (ASSIST-START STANDBY) |
| $S_{4-1}$ | SINGLE-WINDING-SYSTEM DRIVE | PERFORMING ASSIST CONTROL ($I_1^* > I_{th}$) | ASSIST-START STANDBY |
| $S_{4-2}$ | DUAL-WINDING-SYSTEM DRIVE | PERFORMING ASSIST CONTROL ($I_1^* \leq I_{th}$) | PERFORMING ASSIST CONTROL |
| $S_{4-3}$ | ASSIST-START STANDBY | ASSIST-START STANDBY | ASSIST-START STANDBY |
| $S_{4-4}$ | | — (NO RESPONSE) | PERFORMING ASSIST CONTROL |

VEHICLE CONTROL APPARATUS

INCORPORATION BY REFERENCE

The disclosure of Japanese Patent Application No. 2018-150359 filed on Aug. 9, 2018 including the specification, drawings and abstract, is incorporated herein by reference in its entirety.

BACKGROUND OF THE INVENTION

1. Field of the Invention

The invention relates to a vehicle control apparatus.

2. Description of Related Art

A control apparatus that controls a motor that is a source of an assist torque applied to a steering mechanism of a vehicle is conventionally known. For example, a control apparatus disclosed in Japanese Patent Application Publication No. 2004-10024 (JP 2004-10024 A) controls power supply to a motor including two winding systems. The control apparatus includes two pairs of a drive circuit and an electronic control unit (ECU), each pair corresponding to one of the windings of the two winding systems. Each ECU controls the corresponding drive circuit in accordance with a steering torque to independently control power supply to the winding of the corresponding winding system (dual-winding-system drive). The motor as a whole produces an assist torque as a sum of a torque produced by the winding of a first winding system and a torque produced by the winding of a second winding system. Even when an anomaly occurs in the winding of the first winding system, for example, it is possible to run the motor by supplying power to the winding of the second winding system (single-winding-system drive). Although an assist torque applied to the steering mechanism is reduced approximately by half the required torque, this allows continuing a steering assist operation.

The winding system in which the anomaly has occurred may recover to its normal state during the single-winding-system drive. In this case, the single-winding-system drive is preferably switched back to the dual-winding-system drive so that an assist torque of an appropriate magnitude is produced. However, this may bring about the following disadvantage. When the single-winding-system drive is switched to the dual-winding-system drive, a total assist torque produced by the motor is increased by a torque produced by the winding of the winding system recovered to its normal state. This may cause a sudden change in the total assist torque produced by the motor. Although it depends on a driver's steering behavior, the larger the amount of electric current supplied to the winding of the winding system recovered to its normal state, the more likely the sudden change in the assist torque occurs.

SUMMARY OF THE INVENTION

An object of the invention is to provide a vehicle control apparatus capable of reducing a sudden change in a torque produced by a motor having winding groups of a plurality of winding systems.

A vehicle control apparatus according to an aspect of the invention includes a control circuit that independently controls power supply to winding groups, each of the winding groups belonging to one of a plurality of winding systems included in a motor, on a per-winding-system basis based on command values each calculated for a corresponding one of the winding systems in accordance with a target torque to be produced by the motor. The control circuit is configured to transition between a first state in which the control circuit causes the winding groups of the plurality of winding systems to produce the target torque and a second state in which one or more winding systems of the plurality of winding systems have failed and the control circuit causes the winding groups of the other one or more normal winding systems to produce the target torque. If a sum of the command values or a sum of actual current amounts of the normal winding systems is equal to or below a threshold value that is set with reference to zero or a value close to zero when the one or more winding systems recover to a normal state in the second state, the control circuit transitions from the second state to the first state.

When the one or more winding systems recover to the normal state in the second state, a situation in which the one or more winding systems recovered to the normal state additionally produce a torque while the winding groups of the normal winding systems are producing the target torque may occur upon transition from the second state to the first state. Although it depends on a magnitude of the torque produced by the one or more winding systems recovered to the normal state, this may result in an increase to an excessive value or a sudden change in a total torque produced by the motor.

However, according to the above aspect, if a sum of the command values or a sum of actual current amounts of the normal winding systems is equal to or below the threshold value that is set with reference to zero or a value close to zero when the one or more winding systems recover to the normal state in the second state, the control circuit transitions from the second state to the first state. When the sum of the command values or the sum of the actual current values of the normal winding systems is equal to or below the threshold value, a torque required to be produced by the winding groups of the one or more winding systems recovered to the normal state will be considerably small. Hence, even if the winding groups of the one or more winding systems recovered to the normal state additionally produce a torque while the winding group of the normal winding system is producing the target torque, an increase to an excessive value or a sudden change in the total torque produced by the motor can be reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 4 is a diagram illustrating a state transition of the ECU of a comparative example;

FIG. 7 is a diagram illustrating the state transition of the ECU according to the embodiment.

DETAILED DESCRIPTION OF EMBODIMENTS

Figure 1:
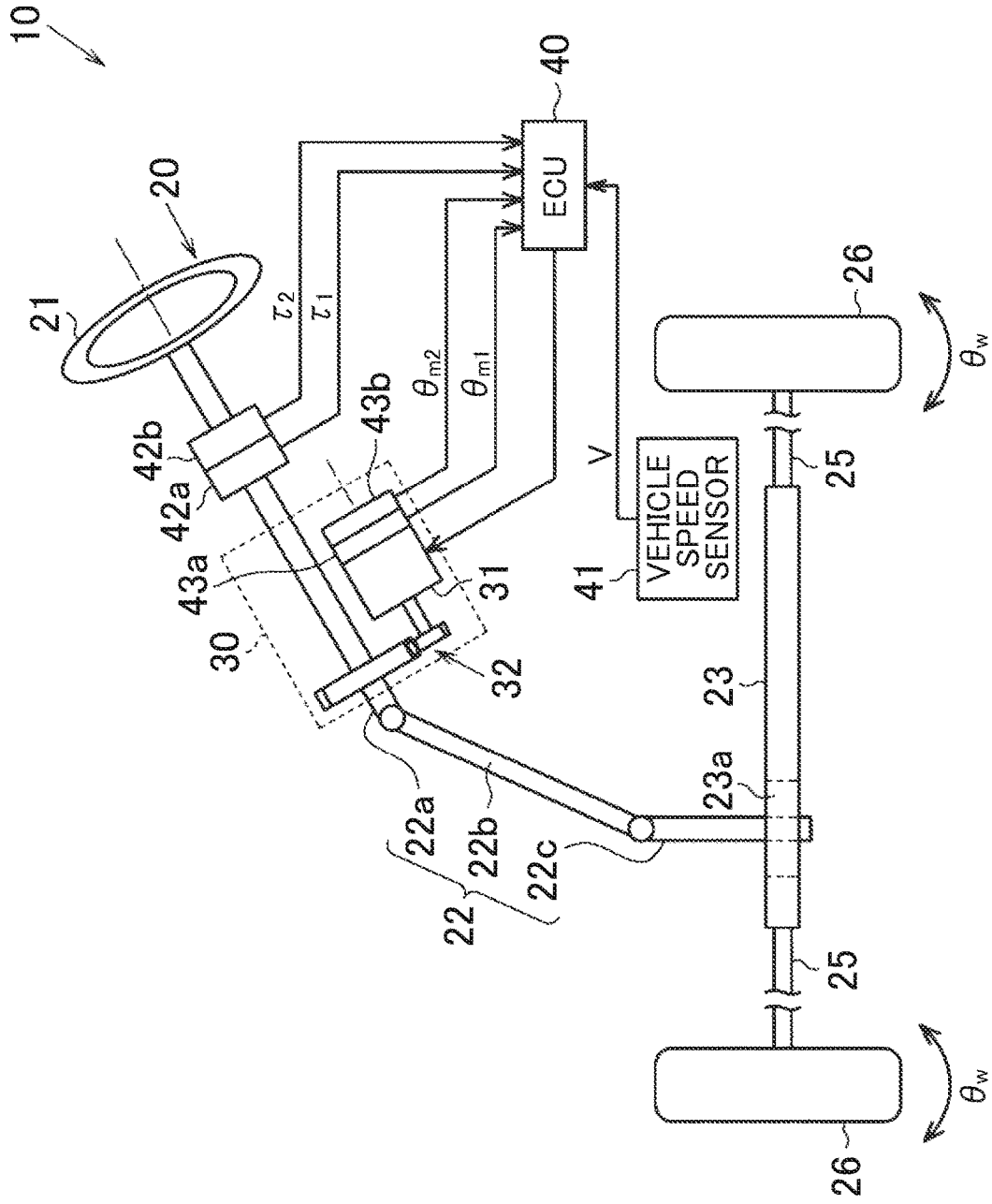
FIG. 1 is a diagram illustrating a schematic configuration of an electric power steering system in which a vehicle control apparatus (ECU) according to an embodiment of the invention is mounted.

A vehicle control apparatus according to an embodiment of the invention embodied as a control apparatus of an electric power steering system (hereinafter referred to as "EPS") is described below. As illustrated in FIG. 1, an EPS 10 includes a steering mechanism 20 that steers steered wheels based on a driver's steering operation, a steering assist mechanism 30 that assists the driver's steering operation, and an an electronic control unit (ECU) 40 that controls actuation of the steering assist mechanism 30.

The steering mechanism 20 includes a steering wheel 21 operated by a driver and a steering shaft 22 that rotates integrally with the steering wheel 21. The steering shaft 22 includes a column shaft 22a connected to the steering wheel 21, an intermediate shaft 22b connected to a lower end portion of the column shaft 22a, and a pinion shaft 22c connected to a lower end portion of the intermediate shaft 22b. A lower end portion of the pinion shaft 22c is meshed with a rack shaft 23 (more specifically, a portion 23a where a rack tooth is provided) extending in a direction intersecting the pinion shaft 22c. A rotary motion of the steering shaft 22 is converted into a reciprocating linear motion of the rack shaft 23 through meshing between the pinion shaft 22c and the rack shaft 23. The reciprocating linear motion is transmitted to a right steered wheel 26 and a left steered wheel 26 each via a corresponding one of tie rods 25 that are coupled to opposite ends of the rack shaft 23. As a result, a steered angle $\theta_w$ of the steered wheels 26 is changed.

The steering assist mechanism 30 includes a motor 31 that is a source of a steering assist force (assist torque). A three-phase brushless motor may be employed as the motor 31, for example. The motor 31 is coupled to the column shaft 22a via a reduction mechanism 32. The reduction mechanism 32 reduces a speed of rotation of the motor 31 and transmits a rotary force of the reduced speed to the column shaft 22a. Thus, a torque of the motor 31 is applied to the steering shaft 22 as a steering assist force to assist a driver's steering operation.

The ECU 40 obtains detection results of various sensors provided in the vehicle as information (state variables) indicating a driver's demand, a driving state, and a steering state and controls the motor 31 in accordance with the various pieces of information obtained. Examples of the various sensors include a vehicle speed sensor 41, torque sensors 42a and 42b, and rotation angle sensors 43a and 43b. The vehicle speed sensor 41 detects a vehicle speed (driving speed of the vehicle) V. The torque sensors 42a and 42b are provided on the column shaft 22a. The torque sensors 42a and 42b detect steering torques $\tau_1$ and $\tau_2$, respectively, that are applied to the steering shaft 22. The rotation angle sensors 43a and 43b are provided on the motor 31. The rotation angle sensors 43a and 43b detect rotation angles $\theta_{m1}$ and $\theta_{m2}$, respectively, of the motor 31.

The ECU 40 performs vector control of the motor 31 using the rotation angles $\theta_{m1}$ and $\theta_{m2}$ of the motor 31 detected through the rotation angle sensors 43a and 43b. The ECU 40 performs assist control by calculating a target assist torque based on the steering torque $\tau_1$, $\tau_2$ and the vehicle speed V and supplying the motor 31 with driving power that causes the steering assist mechanism 30 to produce the calculated target assist torque.

Figure 2:
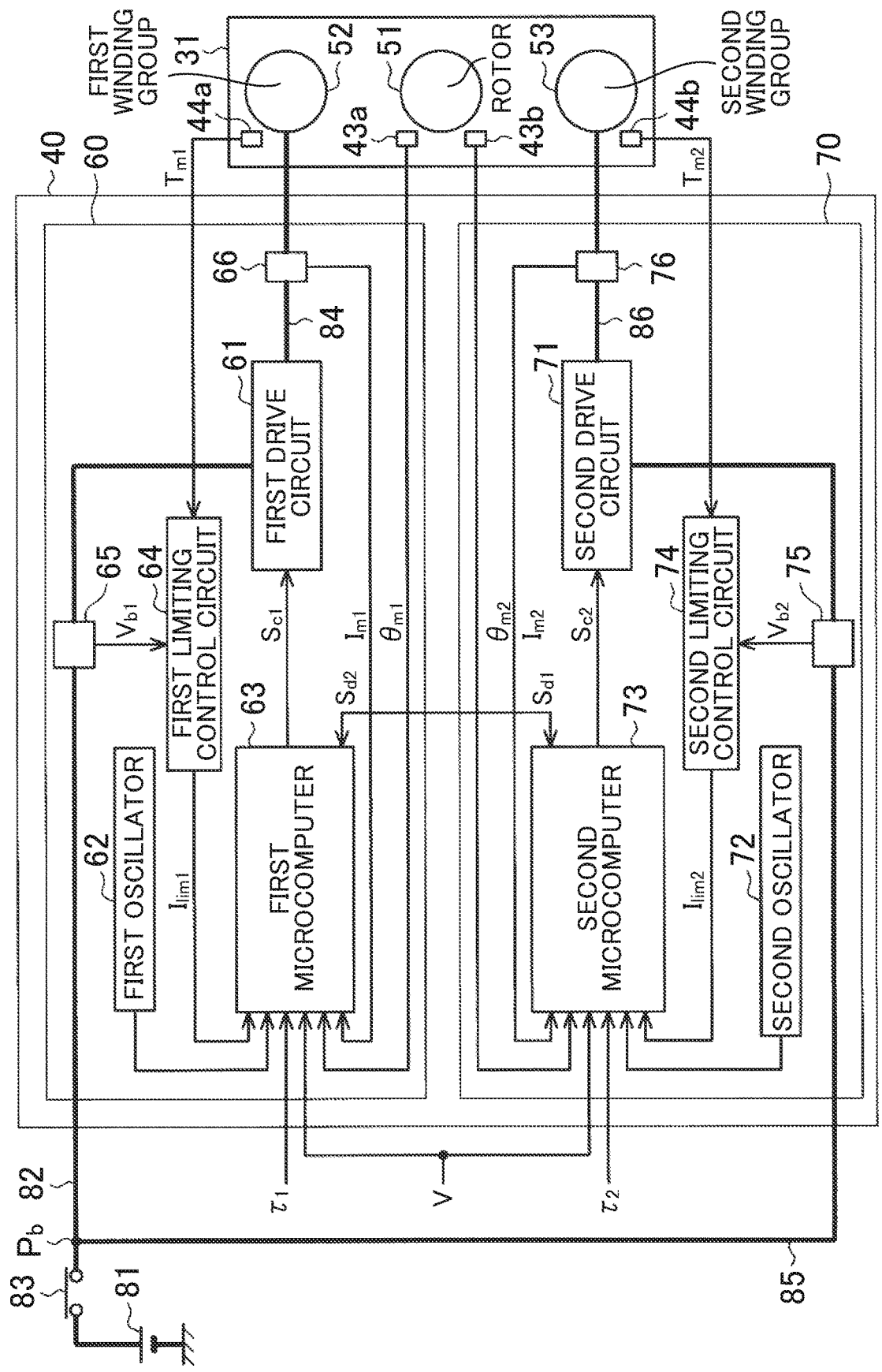
FIG. 2 is a block diagram of the ECU according to the embodiment.

A configuration of the motor 31 is described below. As illustrated in FIG. 2, the motor 31 includes a rotor 51, and a first winding group 52 and a second winding group 53 wound around stators (not illustrated). The first winding group 52 includes a U-phase coil, a V-phase coil, and a W-phase coil. The second winding group 53 includes a U-phase coil, a V-phase coil, and a W-phase coil as well. The motor 31 includes temperature sensors 44a and 44b in addition to the rotation angle sensors 43a and 43b. The temperature sensor 44a detects a temperature of the first winding group 52. The temperature sensor 44b detects a temperature of the second winding group 53.

The ECU 40 is described in detail below. As illustrated in FIG. 2, the ECU 40 controls power supply to the first winding group 52 and the second winding group 53 on a per-winding-system basis. The ECU 40 includes a first control circuit 60 that controls power supply to the first winding group 52 and a second control circuit 70 that controls power supply to the second winding group 53.

The first control circuit 60 includes a first drive circuit 61, a first oscillator 62, a first microcomputer 63, and a first limiting control circuit 64. Electric power is supplied to the first drive circuit 61 from a direct-current (DC) power supply 81, e.g., a battery mounted in the vehicle. The first drive circuit 61 and the DC power supply 81 (more specifically, a positive terminal of the DC power supply 81) are connected by a first feeder 82. A power switch 83, e.g., an ignition switch, of the vehicle is provided on the first feeder 82. The power switch 83 is operated to actuate a drive source (e.g., an engine) for driving the vehicle. When the power switch 83 is turned on, power from the DC power supply 81 is supplied to the first drive circuit 61 via the first feeder 82. A voltage sensor 65 is provided on the first feeder 82. The voltage sensor 65 detects a voltage $V_{b1}$ of the DC power supply 81. Power from the DC power supply 81 is supplied to the first microcomputer 63 and the rotation angle sensor 43a through feeders (not illustrated).

The first drive circuit 61 is a pulse width modulation (PWM) inverter formed by connecting three legs in parallel. Each leg is a basic unit formed by connecting two switching elements, such as field-effect transistors (FETs), in series and corresponds to one of the three phases (U, V, and W). The first drive circuit 61 converts direct current power supplied from the DC power supply 81 into three-phase alternating current power such that the switching element of each phase performs a switching operation based on a command signal $S_{c1}$ generated by the first microcomputer 63. The three-phase alternating current power generated by the first drive circuit 61 is supplied to the first winding group 52 via a feeder path 84 formed of bus bars or cables, for example, provided individually for each phase. A current sensor 66 is provided on the feeder path 84. The current sensor 66 detects a current $I_{m1}$ supplied from the first drive circuit 61 to the first winding group 52.

The first oscillator (clock generation circuit) 62 generates a clock that is a synchronization signal for operating the first microcomputer 63. The first microcomputer 63 performs various processing in accordance with the clock generated by the first oscillator 62. The first microcomputer 63 calculates a target assist torque to be produced by the motor 31 based on the steering torque $\tau_1$ detected through the torque sensor 42a and the vehicle speed V detected through the vehicle speed sensor 41, and calculates a first current command value $I_1^*$ (see FIG. 3) in accordance with the calculated target assist torque. The first current command value $I_1^*$ is a target value of current to be supplied to the first winding group 52. The first microcomputer 63 generates the command signal $S_{c1}$ (PWM signal) for the first drive circuit 61 by performing current feedback control that causes an actual value of current supplied to the first winding group 52 to follow the first current command value $I_1^*$. The command signal $S_{c1}$ defines a duty ratio of each switching element of the first drive circuit 61. The duty ratio means a ratio of an on period of the switching element to a pulse cycle. The first microcomputer 63 controls power supply to the first winding group 52 using the rotation angle $\theta_{m1}$ of (the rotor 51 of) the motor 31 detected through the rotation angle sensor 43a. Electric current is supplied to the first winding group 52 in accordance with the command signal $S_{c1}$ through the first drive circuit 61, causing the first winding group 52 to produce a torque in accordance with the first current command value $I_1^*$.

The first limiting control circuit 64 calculates a limiting value $I_{lim1}$ for limiting the amount of current supplied to the first winding group 52 in accordance with the voltage $V_{b1}$ of the DC power supply 81 detected through the voltage sensor 65 and how much (the first winding group 52 of) the motor 31 is heated. The limiting value $I_{lim1}$ is set as an upper limit of the amount of current supplied to the first winding group 52 so as to reduce a decrease in the voltage $V_{b1}$ of the DC power supply 81 or to protect the motor 31 from overheating. When the voltage $V_{b1}$ of the DC power supply 81 detected through the voltage sensor 65 is equal to or below a voltage threshold value, the first limiting control circuit 64 calculates the limiting value $I_{lim1}$ in accordance with the voltage $V_{b1}$ at that time. The voltage threshold value is set with reference to a lower limit of an assist assurance voltage range of the EPS 10.

When a temperature $T_{m1}$ of the first winding group 52 (or its surrounding) detected through the temperature sensor 44a is equal to or below a temperature threshold value, the first limiting control circuit 64 calculates the limiting value $I_{lim1}$. When the limiting value $I_{lim1}$ is calculated, the first microcomputer 63 limits the amount of current supplied to the first winding group 52 (a torque to be produced by the first winding group 52) in accordance with the limiting value $I_{lim1}$.

The second control circuit 70 is basically identical in configuration to the first control circuit 60. More specifically, the second control circuit 70 includes a second drive circuit 71, a second oscillator 72, a second microcomputer 73, and a second limiting control circuit 74.

Electric power is supplied to the second drive circuit 71 from the DC power supply 81. A junction $P_b$ is provided on the first feeder 82 between the power switch 83 and the first control circuit 60. The junction $P_b$ and the second drive circuit 71 are connected by a second feeder 85. When the power switch 83 is turned on, power from the DC power supply 81 is supplied to the second drive circuit 71 via the second feeder 85. A voltage sensor 75 is provided on the second feeder 85. The voltage sensor 75 detects a voltage $V_{b2}$ of the DC power supply 81.

Three-phase alternating current power generated by the second drive circuit 71 is supplied to the second winding group 53 via a feeder path 86 formed of bus bars or cables, for example, provided individually for each phase. A current sensor 76 is provided on the feeder path 86. The current sensor 76 detects a current $I_{m2}$ supplied from the second drive circuit 71 to the second winding group 53.

The second microcomputer 73 calculates a target assist torque to be produced by the motor 31 based on the steering torque $\tau_2$ detected through the torque sensor 42b and the vehicle speed V detected through the vehicle speed sensor 41, and calculates a second current command value $I_2^*$ (see FIG. 3) in accordance with the calculated target assist torque. The second microcomputer 73 generates a command signal $S_{c2}$ for the second drive circuit 71 by performing current feedback control that causes an actual value of current supplied to the second winding group 53 to follow the second current command value $I_2^*$. Electric current is supplied to the second winding group 53 in accordance with the command signal $S_{c2}$ through the second drive circuit 71, causing the second winding group 53 to produce a torque in accordance with the second current command value $I_2^*$.

The second limiting control circuit 74 calculates a limiting value $I_{lim2}$ for limiting the amount of current supplied to the second winding group 53 in accordance with the voltage $V_{b2}$ of the DC power supply 81 detected through the voltage sensor 75 and how much (the second winding group 53 of) the motor 31 is heated. When the limiting value $I_{lim2}$ is calculated, the second microcomputer 73 limits the amount of current supplied to the second winding group 53 (a torque to be produced by the second winding group 53) in accordance with the limiting value $I_{lim2}$.

The first microcomputer 63 and the second microcomputer 73 exchange digital signals via a communication line. As a specification for communication between the first microcomputer 63 and the second microcomputer 73, for example, serial peripheral interface (SPI) that is a synchronous serial communication interface specification may be employed. Each of the first microcomputer 63 and the second microcomputer 73 has a function that detects an anomaly in itself and the winding system to which the microcomputer belongs.

The first microcomputer 63 generates a first state signal $S_{d1}$ indicating a state of a first winding system to which the first microcomputer 63 belongs as a digital signal, and feeds the generated first state signal $S_{d1}$ to the second microcomputer 73. The first state signal $S_{d1}$ contains an anomaly occurrence state, an assist state, and an assist amount. The anomaly occurrence state includes whether an anomaly occurs in the first microcomputer 63, the first drive circuit 61, and the rotation angle sensor 43a, for example. The assist state includes two states, a state in which the first microcomputer 63 can perform assist control and a state in which the first microcomputer 63 cannot perform assist control due to a decrease in supply voltage, etc. The state in which the first microcomputer 63 can perform assist control includes two states, a state in which assist control is being performed and a state in which assist control is on standby for start of assist control (assist-start standby). The assist amount indicates a magnitude of an assist torque to be produced by the first winding group 52 and corresponds to the first current command value $I_1^*$ that is a target value of current to be supplied to the first winding group 52.

As with the first microcomputer 63, the second microcomputer 73 generates a second state signal $S_{d2}$ indicating a state of a second winding system to which the second microcomputer 73 belongs as a digital signal, and feeds the generated second state signal $S_{d2}$ to the first microcomputer 63.

Figure 3:
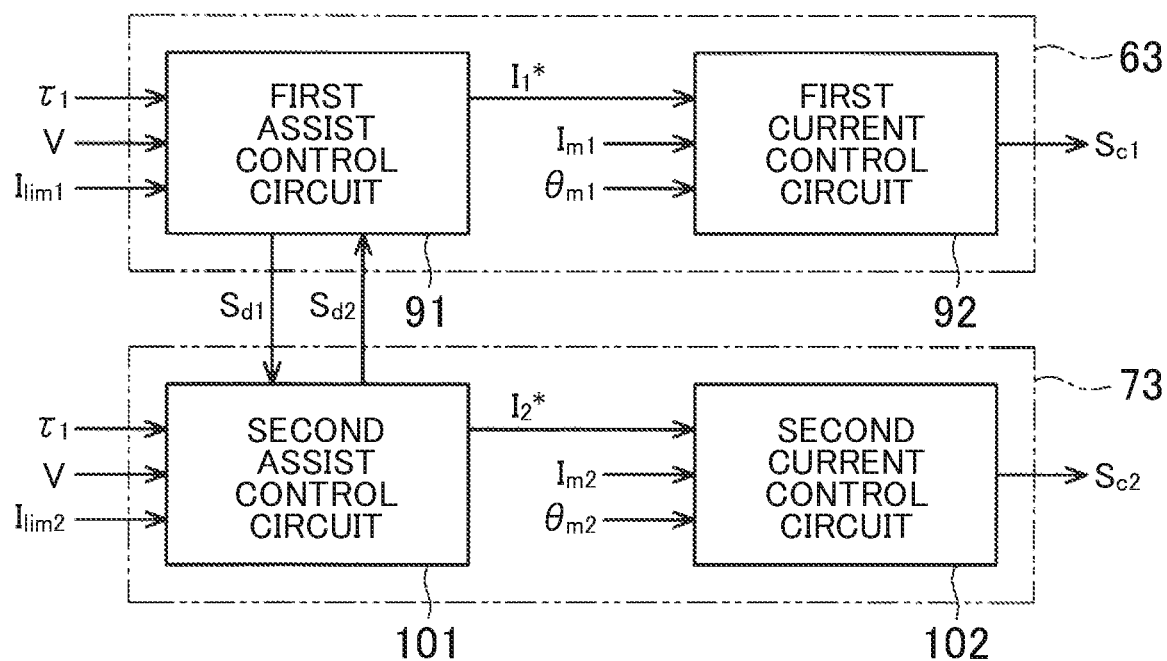
FIG. 3 is a control block diagram of a first microcomputer and a second microcomputer of the ECU according to the embodiment.

Configurations of the first microcomputer 63 and the second microcomputer 73 are detailed below. As illustrated in FIG. 3, the first microcomputer 63 includes a first assist control circuit 91 and a first current control circuit 92.

The first assist control circuit 91 calculates a target assist torque to be produced by the motor 31 based on the steering torque $\tau_1$ detected through the torque sensor 42a and the vehicle speed V detected through the vehicle speed sensor 41, and calculates the first current command value $I_1^*$ based on the calculated target assist torque. The first current command value $I_1^*$ is a target value of current to be supplied to the first winding group 52 so that the motor 31 produces the target assist torque of an appropriate magnitude in accordance with the steering torque $\tau_1$ and the vehicle speed V. The first assist control circuit 91 calculates the first current command value $I_1^*$ such that the larger an absolute value of the steering torque $\tau_1$ and the lower the vehicle speed V, the larger (an absolute value of) the first current command value $I_1^*$ is. The first current command value $I_1^*$ (absolute value) is set to a half (50%) of an amount of current (100%) necessary for causing the motor 31 to produce the target assist torque.

When the limiting value $I_{lim1}$ is calculated by the first limiting control circuit 64, the first assist control circuit 91 limits a torque produced by the first winding group 52 in accordance with the calculated limiting value $I_{lim1}$. More specifically, the first assist control circuit 91 limits the initial first current command value $I_1^*$ calculated in accordance with the target assist torque up to the limiting value $I_{lim1}$. When the limiting value $I_{lim1}$ is a duty ratio expressed in percentage, for example, the first assist control circuit 91 calculates a final value of the first current command value $I_1^*$ by applying the limiting value $I_{lim1}$ to an initial value of the first current command value $I_1^*$ calculated in accordance with the target assist torque.

The first current control circuit 92 generates the command signal $S_{c1}$ (PWM signal) for the first drive circuit 61 by performing current feedback control that causes an actual value of the current $I_{m1}$ supplied to the first winding group 52 to follow the first current command value $I_1^*$. The first current control circuit 92 controls power supply to the first winding group 52 using the rotation angle $\theta_{m1}$ of (the rotor 51 of) the motor 31 detected through the rotation angle sensor 43a. Electric current is supplied to the first winding group 52 in accordance with the command signal $S_{c1}$ through the first drive circuit 61, causing the first winding group 52 to produce a torque in accordance with the first current command value $I_1^*$.

The second microcomputer 73 is basically identical in configuration to the first microcomputer 63. More specifically, the second microcomputer 73 includes a second assist control circuit 101 and a second current control circuit 102.

The second assist control circuit 101 calculates a target assist torque to be produced by the motor 31 based on the steering torque $\tau_2$ detected through the torque sensor 42b and the vehicle speed V detected through the vehicle speed sensor 41, and calculates the second current command value $I_2^*$ based on the calculated target assist torque. The second current command value $I_2^*$ is a target value of current to be supplied to the second winding group 53 so that the motor 31 produces the target assist torque of an appropriate magnitude in accordance with the steering torque $\tau_2$ and the vehicle speed V. The second assist control circuit 101 calculates the second current command value $I_2^*$ such that the larger an absolute value of the steering torque $\tau_2$ and the lower the vehicle speed V, the larger (an absolute value of) the second current command value $I_2^*$ is. The second current command value $I_2^*$ (absolute value) is set to a half (50%) of the amount of current (100%) necessary for causing the motor 31 to produce the target assist torque.

When the limiting value $I_{lim2}$ is calculated by the second limiting control circuit 74, the second assist control circuit 101 limits a torque produced by the second winding group 53 in accordance with the calculated limiting value $I_{lim2}$. More specifically, the second assist control circuit 101 limits the initial second current command value $I_2^*$ calculated in accordance with the target assist torque up to the limiting value $I_{lim2}$. When the limiting value $I_{lim2}$ is a duty ratio expressed in percentage, for example, the second assist control circuit 101 calculates a final value of the second current command value $I_2^*$ by applying the limiting value $I_{lim2}$ to an initial value of the second current command value $I_2^*$ calculated in accordance with the target assist torque.

The second current control circuit 102 generates the command signal $S_{c2}$ (PWM signal) for the second drive circuit 71 by performing current feedback control that causes an actual value of the current $I_{m2}$ supplied to the second winding group 53 to follow the second current command value $I_2^*$. The second current control circuit 102 controls power supply to the second winding group 53 using the rotation angle $\theta_{m2}$ of (the rotor 51 of) the motor 31 detected through the rotation angle sensor 43b. Electric current is supplied to the second winding group 53 in accordance with the command signal $S_{c2}$ through the second drive circuit 71, causing the second winding group 53 to produce a torque in accordance with the second current command value $I_2^*$.

In the configuration described above, the motor 31 includes two winding groups, each winding group belonging to one of the two winding systems. Power supply to the winding groups of the different winding systems is controlled independently. Accordingly, even when an anomaly occurs in a winding of the first winding system, for example, it is possible to run the motor 31 by supplying power to windings of the second winding system (single-winding-system drive). The winding system in which the anomaly has occurred may recover to its normal state during the single-winding-system drive. In this case, it is preferable to switch a method used by the ECU 40 in driving the motor 31 from the single-circuit drive to the dual-circuit drive so that an assist torque of a more appropriate magnitude is produced.

An example of a state transition of the ECU 40 is described below as a comparative example. A situation in which, after an anomaly occurs in the second winding system during steering of the steering wheel 21, the second winding system recovers to its normal state is assumed in this example.

As illustrated in FIG. 4, the ECU 40 sequentially transitions from a first state $S_1$, to a second state $S_2$, to a third state $S_3$, and to a fourth state $S_4$. The first state $S_1$ is a state in which both the first winding system and the second winding system are in a normal condition and both the first microcomputer 63 and the second microcomputer 73 are performing assist control. The first microcomputer 63 supplies power to the first winding group 52 in accordance with a steering state. The second microcomputer 73 supplies power to the second winding group 53 in accordance with the steering state. More specifically, the ECU 40 performs the dual-winding-system drive in which the ECU 40 drives the motor 31 by supplying power to the first winding group 52 and the second winding group 53.

The second state $S_2$ is a state in which an anomaly has occurred in the second winding system. The first microcomputer 63 is performing assist control that supplies power to the first winding group 52 in accordance with a steering state. The second microcomputer 73 stops performing assist control due to occurrence of the anomaly in the second winding system. More specifically, the ECU 40 performs the single-winding-system drive in which the ECU 40 drives the motor 31 by supplying power only to the first winding group 52. Examples of the anomaly in the second winding system detected by the second microcomputer 73 include an anomaly in the second winding group 53, the second drive circuit 71, or the rotation angle sensor 43b, and an anomaly in a supply voltage of the second drive circuit 71.

The third state $S_3$ is a state in which the second winding system has recovered to its normal state. The first microcomputer 63 is performing assist control. When recovery of the second winding system to its normal state is detected, the second microcomputer 73 generates the second state signal $S_{d2}$ to resume assist control. At this point in time, the second microcomputer 73 is on standby for start of assist control, and the ECU 40 continues performing the single-winding-system drive in which the ECU 40 drives the motor 31 by supplying power only to the first winding group 52.

The fourth state $S_4$ is a state in which, after the second winding system has recovered to its normal state, both the first microcomputer 63 and the second microcomputer 73 are performing assist control again. More specifically, the ECU 40 switches from the single-winding-system drive in which the ECU 40 drives the motor 31 by supplying power only to the first winding group 52 to the dual-winding-system drive in which the ECU 40 drives the motor 31 by supplying power to the first winding group 52 and the second winding group 53.

Figure 5:
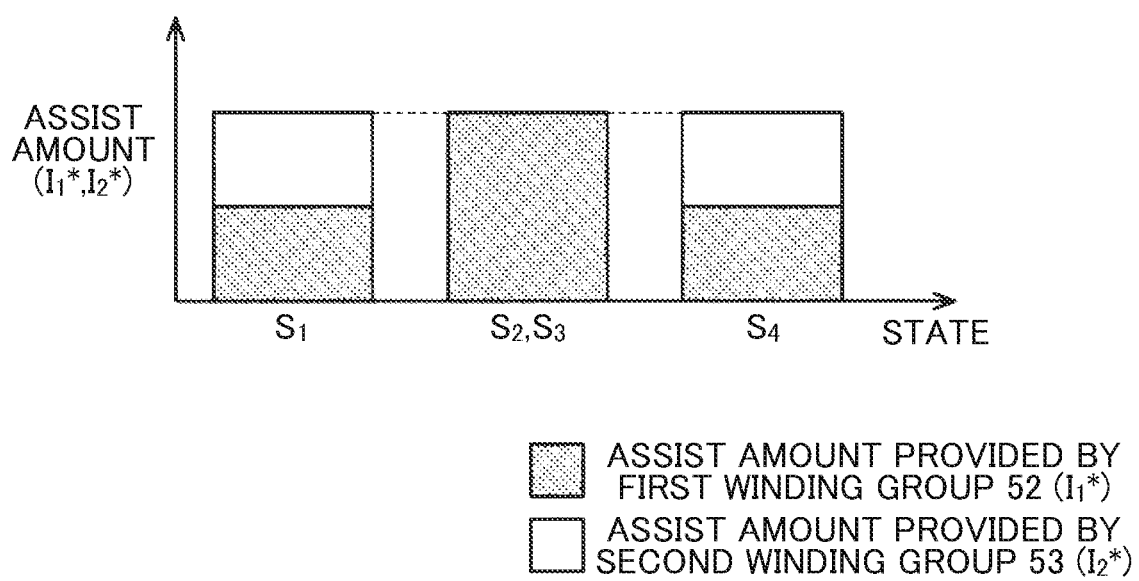
FIG. 5 is a graph illustrating an ideal relationship between the state transition of the ECU and an assist amount of a comparative example.

An ideal relationship between the state transition of the ECU 40 and the assist amount is described below as a comparative example. As illustrated in FIG. 5, when the ECU 40 is in the first state $S_1$ in which the dual-winding-system drive is performed, one half of a necessary assist amount is provided by a torque produced by the first winding group 52, and the other half thereof is provided by a torque produced by the second winding group 53. More specifically, each of the first current command value $I_1^*$ and the second current command value $I_2^*$ is set to a half (50%) of the amount of current (100%) necessary for causing the motor 31 to produce the target assist torque.

When the ECU 40 transitions from the first state $S_1$ in which the dual-winding-system drive is performed to the second state $S_2$ in which the single-winding-system drive is performed, the entire necessary assist amount is provided by a torque produced by the first winding group 52. More specifically, the first current command value $I_1^*$ is set to a value (twice the value of that of normal times in which the dual-winding-system drive is performed) corresponding to the amount of current necessary for causing the motor 31 to produce the target assist torque. The second current command value $I_2^*$ is set to zero or, alternatively, feeding the second current command value $I_2^*$ to the second current control circuit 102 is stopped.

When the ECU 40 transitions from the second state $S_2$ to the third state $S_3$ (recovery to its normal state is detected) and then to the fourth state $S_4$, ideally, one half of a necessary assist amount is provided by a torque produced by the first winding group 52 and the other half is provided by a torque produced by the second winding group 53 as in the case in which the ECU 40 is in the first state $S_1$.

However, the following disadvantage may arise when the ECU 40 actually transitions from the second state $S_2$ to the third state $S_3$ and then to the fourth state $S_4$. A short time lag develops from when the second winding system actually recovers to its normal state to when the first microcomputer 63 recognizes that the second winding system has recovered to its normal state based on the second state signal $S_{d2}$. This causes completion of adjustment of the assist amount (the first current command value $I_1^*$) by the first microcomputer 63 to lag behind recovery of the second winding system to its normal state. As a result, the motor 31 may produce, although transiently, an excessively high total assist amount (assist torque). Furthermore, although it depends on the magnitude of the torque produced by the second winding group 53 in accordance with a steering state when the second winding system recovers to its normal state, the assist amount may change (in this case, increase) sharply. This is specifically described below.

Figure 6:
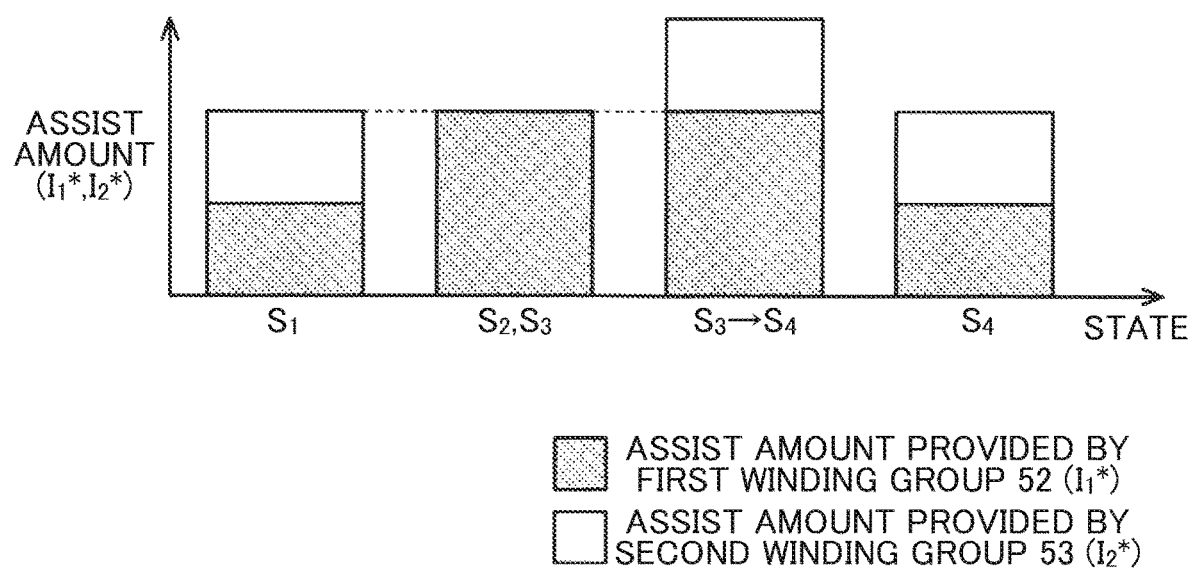
FIG. 6 is a graph illustrating an actual relationship between the state transition of the ECU and the assist amount of the comparative example.

As illustrated in FIG. 6, when the ECU 40 transitions from the third state $S_3$ to the fourth state $S_4$, with an entire assist torque required of the motor 31 being produced by the first winding group 52, the second winding group 53 additionally produces a torque. As a result, a total torque produced by the motor 31 exceeds the assist torque required of the motor 31 by the torque produced by the second winding group 53. At this time, although it depends on a driver's steering behavior, the total assist torque produced by the motor 31 may increase to an excessive value or change suddenly. The second winding group 53 produces a half of the assist torque required of the motor 31 as usual.

Thereafter, upon recognizing that the second winding system has recovered to its normal state based on the second state signal $S_{d2}$, the first microcomputer 63 adjusts the first current command value $I_1^*$ to its regular value corresponding to one half of the assist torque required of the motor 31. Hence, the ECU 40 recovers to its regular state in which the assist torque required of the motor 31 is produced as a sum of the torque produced by the first winding group 52 and the torque produced by the second winding group 53.

As described above, at recovery from the single-winding-system drive to the dual-winding-system drive, the total assist torque produced by the motor 31 may increase to an excessive value or change suddenly because adjustment of the torque produced by the first winding group 52 lags behind. In view of the above, according to the embodiment, the state of the ECU 40 transitions as follows to reduce an increase to an excessive value or a sudden change in the assist torque at recovery from the single-winding-system drive to the dual-winding-system drive. A situation in which, after an anomaly occurs in the second winding system during steering of the steering wheel 21, the second winding system recovers to its normal state is assumed below as well.

As illustrated in FIG. 7, when an anomaly occurs in the second winding system when the ECU 40 is in the first state $S_1$ in which the dual-winding-system drive is performed, the ECU 40 transitions from the first state $S_1$ to the second state $S_2$ to start the single-winding-system drive using the first winding group 52. After transitioning from the second state $S_2$ in which the single-winding-system drive using the first winding group 52 is performed to the third state $S_3$ in which recovery of the second winding system to its normal state is detected, the ECU 40 transitions to any one of the following four states: $S_{4-1}$, $S_{4-2}$, $S_{4-3}$, and $S_{4-4}$ in accordance with an operating state of the first microcomputer 63.

The state $S_{4-1}$ is a state in which the first microcomputer 63 is performing assist control that supplies power to the first winding group 52 in accordance with a steering state and the second microcomputer 73 is held in an assist-start-standby state. If the first microcomputer 63 is performing assist control and the first current command value $I_1^*$ is above a current threshold value $I_{th}$ when recovery of the second winding system to its normal state is detected, the second microcomputer 73 is held in the assist-start-standby state. The assist-start-standby state is a state in which, although assist control (supplying power to a corresponding winding group) is available, the microcomputer is waiting for a timing when power is to be supplied to the winding group.

The current threshold value $I_{th}$ is set with reference to a current command value (zero or a value close to zero) in accordance with an assist torque required of the motor 31 when the steering wheel 21 is steered to a neutral steering position or a position close thereto, for example. Zero is a lower limit (lower limit of a state transition condition) of the current threshold value $I_{th}$ and corresponds to a total current command value (a current command value for a total torque required of the motor 31) in a state in which a normal winding system stops driving and immediately after when a microcomputer of the normal winding system detects recovery of a failed winding system (a state in which none of the winding systems is active). The value close to zero is an upper limit (upper limit of the state transition condition) of the current threshold value $I_{th}$ and corresponds to a total current command value in a state in which the normal winding system is in the assist-start-standby state (on standby to perform assist control) or in a state in which the normal system substantially stops driving and immediately after when the microcomputer of the normal winding system detects recovery of the failed winding system.

As described above, although the second winding system has recovered to its normal state, the second microcomputer 73 does not supply power to the second winding group 53 on purpose because current above the current threshold value $I_{th}$ is supplied to the first winding group 52. Accordingly, with the entire assist torque required of the motor 31 produced by the first winding group 52, the second winding group 53 does not additionally produce a torque. Hence, an increase to an excessive value or a sudden change in the total assist amount (assist torque) produced by the motor 31 does not occur.

The state $S_{4-2}$ is a state in which both the first microcomputer 63 and the second microcomputer 73 perform assist control. If the first microcomputer 63 is performing assist control and the first current command value $I_1^*$ is equal to or below the current threshold value $I_{th}$ when recovery of the second winding system to its normal state is detected, the second microcomputer 73 performs assist control that supplies power to the second winding group 53 in accordance with a steering state.

Figure 8:
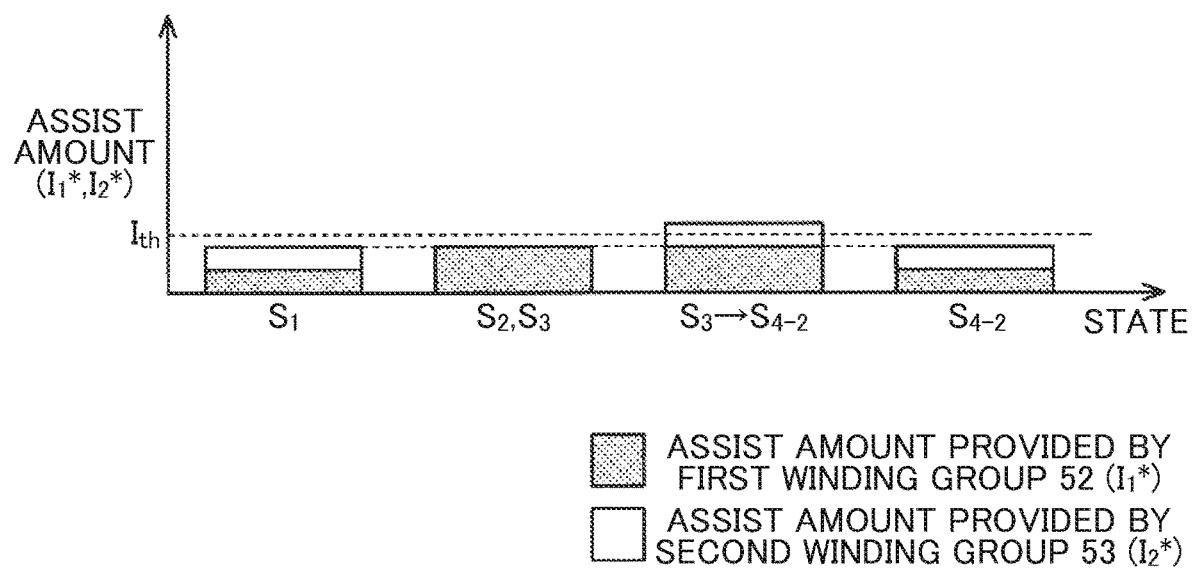
FIG. 8 is graph illustrating the relationship between the state transition of the ECU according to the embodiment and the assist amount.

As illustrated in FIG. 8, when the second winding system recovers to its normal state (from the state $S_2$ to the state $S_3$), although the first microcomputer 63 is performing assist control, the assist amount (assist torque) required of the motor 31 is considerably small. This is obvious from the fact that the first current command value $I_1^*$ generated by the first microcomputer 63 that is performing the single-winding-system drive is equal to or below the current threshold value $I_{th}$. As a matter of course, the magnitude of the torque produced by the second winding group 53 is considerably small. The torque produced by the second winding group 53 at this time is a half of the considerably small total assist torque required of the motor 31. Even if the second winding group 53 produces the considerably small torque while the first winding group 52 is producing the considerably small torque, a change in the total assist torque produced by the motor 31 is considerably small. Hence, an increase to an excessive value or a sharp change in the total assist amount produced by the motor 31 is reduced.

As illustrated in FIG. 7, the state $S_{4-3}$ is a state in which both the first microcomputer 63 and the second microcomputer 73 are held in the assist-start-standby state. If the first microcomputer 63 is not performing assist control when recovery of the second winding system to its normal state is detected, the second microcomputer 73 is held in the assist-start-standby state. Conceivable examples of a situation in which the first microcomputer 63 is not performing assist control include a situation in which the vehicle is traveling straight and the steering wheel 21 is held in the neutral steering position. When the steering wheel 21 is steered to the right or to the left with reference to the neutral steering position, the first microcomputer 63 and the second microcomputer 73 individually perform assist control in accordance with the steering state.

The state $S_{4-4}$ is a state in which at least the second microcomputer 73 performs assist control. When recovery of the second winding system to its normal state is detected, if the second microcomputer 73 receives no response from the first microcomputer 63 but a steering assist operation is required, the second microcomputer 73 performs assist control. A situation in which the second microcomputer 73 receives no response from the first microcomputer 63 is more specifically a situation in which the second microcomputer 73 fails to obtain the first state signal $S_{d1}$ generated by the first microcomputer 63. A situation in which a steering assist operation is required is more specifically a situation in which, when the steering wheel 21 is steered to the right or to the left with reference to the neutral steering position or, in other words, the steering torques $\tau_1$ and $\tau_2$ are detected to be above zero.

When occurrence of an anomaly in the first winding system is detected by the first microcomputer 63 during the dual-winding-system drive, the ECU 40 operates in a manner similar to that described above through the example in which an anomaly occurs in the second winding system. Note that, in this case, an operation related to assist control of the first microcomputer 63 and an operation related to assist control of the second microcomputer 73 are reversed from those in the above-described example in which an anomaly occurs in the second winding system.

Thus, the embodiment provides the following advantages.

(1) When one of the two winding systems fails, the ECU 40 transitions from the first state (the state $S_1$ of FIG. 8) in which the ECU 40 causes the first winding group 52 and the second winding group 53 to produce a target assist torque to the second state (the state $S_2$ of FIG. 8) in which the ECU 40 causes the winding group of the other normal winding system (the first winding group 52 or the second winding group 53) to produce the target assist torque. If a current command value for the normal winding system is equal to or below the current threshold value $I_{th}$ that is set with reference to zero or a value close to zero when the failed winding system recovers to its normal state (the state $S_3$ of FIG. 8) in the second state, the ECU 40 transitions from the second state in which the motor 31 is driven by the winding group of the one winding system to the first state (the state $S_{4-2}$ of FIG. 8) in which the motor 31 is driven by the winding groups of the two winding systems. When the current command value for the normal winding system is equal to or below the current threshold value $I_{th}$, a torque required of the winding group of the winding system recovered to its normal state will be considerably small. Hence, even if the winding group of the winding system recovered to its normal state additionally produces a torque while the winding group of the normal winding system is producing the target assist torque, occurrence of an increase to an excessive value or a sudden change (in this example, a sharp increase) in a total torque produced by the motor 31 is reduced. Application of an unintended assist torque to the steering mechanism 20 is also reduced. This gives a driver a favorable steering feel. Furthermore, smooth vehicle behavior or comfortable driving can be obtained.

(2) Even when an anomaly occurs in the first winding system, the ECU 40 drives the motor 31 by supplying power to the winding group of a second winding system that is in its normal state. The ECU 40 causes the winding group of the normal winding system to produce the assist torque required of the motor 31. More specifically, the ECU 40 sets a target value of current to be supplied to the winding group of the normal winding system to a value twice as large as a value for normal times in which the dual-winding-system drive is performed. This causes the motor 31 to produce an assist torque of a magnitude similar to that produced when the dual-winding-system drive is performed even if an anomaly occurs in the first winding system. Hence, appropriate steering assist can be continued.

(3) If the current command value for the normal winding system is above the current threshold value $I_{th}$ in the second state (the state $S_2$ of FIG. 8) in which the first winding system has failed and the ECU 40 causes the winding group of the other normal winding system to produce the target assist torque, and when the failed winding system recovers to its normal state (the state $S_3$ of FIG. 8), the ECU 40 is held in the second state as a standby state for transition from the second state to the first state. This allows the ECU 40 to immediately transition from the second state to the first state when the current command value for the normal winding system drops to a value equal to or below the current threshold value $I_{th}$.

(4) When the second winding system has recovered to its normal state, the second microcomputer 73 may fail to obtain the first state signal $S_{d1}$ from the first microcomputer 63 due to a communication failure between the first microcomputer 63 and the second microcomputer 73, for example. In this case, if a steering assist operation is required, although the second microcomputer 73 cannot obtain an operating state of the first microcomputer 63, the second microcomputer 73 causes a torque to be produced by supplying power to the second winding group 53. Thus, an undesirable situation in which no assist torque is applied to the steering mechanism 20 when a steering assist operation is required can be avoided by performing assist control using the second winding system recovered to its normal state even when it is unknown whether the first winding system is performing assist control.

(5) The ECU 40 includes the first control circuit 60 and the second control circuit 70 that control power supply to the first winding group 52 and the second winding group 53 independently on a per-winding-system basis. Even if one of the first winding group 52 and the second winding group 53 or one of the first control circuit 60 and the second control circuit 70 fails, it is possible to run the motor 31 using the other normal winding group or the other normal control circuit. Hence, operational reliability of the motor 31 can be increased.

(6) The first control circuit 60 and the second control circuit 70 exchange the first state signal $S_{d1}$ generated by the first control circuit 60 and the second state signal $S_{d2}$ generated by the second control circuit 70 with each other. The first state signal $S_{d1}$ contains the first current command value $I_1^*$ calculated by the first microcomputer 63. The second state signal $S_{d2}$ contains the second current command value $I_2^*$ calculated by the second microcomputer 73. Accordingly, each of the first control circuit 60 and the second control circuit 70 can obtain the current command value of the other winding system by exchanging the first state signal $S_{d1}$ and the second state signal $S_{d2}$.

The embodiment may be modified as follows. According to the embodiment, if the current command value for the normal winding system is equal to or below the current threshold value $I_{th}$ when the failed winding system recovers to its normal state (the state $S_3$ of FIG. 8) in the second state, the ECU 40 transitions from the second state to the first state (the state $S_{4-2}$ of FIG. 8). Alternatively, the state of the ECU 40 may transition as follows. If an amount of current (actual current amount) that is actually supplied to the winding group of the normal winding system is equal to or below the current threshold value $I_{th}$ when the failed winding system recovers to its normal state in the second state, the ECU 40 may transition from the second state to the first state (the state $S_{4-2}$ of FIG. 8).

According to the embodiment, the ECU 40 includes the first control circuit 60 and the second control circuit 70 that are independent from each other. Alternatively, for example, the first microcomputer 63 and the second microcomputer 73 may be constructed as a single microcomputer in accordance with a product specification.

When an anomaly occurs in the second winding system, for example, the ECU 40 stops power supply to the motor 31 through the second winding system but continues power supply to the motor 31 through the other normal first winding system. When the motor 31 continues to be driven with the single-winding-system drive under a high load, the torque produced by the winding group of the normal first winding system (the amount of current supplied to the winding group of the first winding system) may be limited to be lower than an initial torque by overheat protection control. In view of this, when the second winding system recovers to its normal state with the overheat protection control being performed in the normal first winding system, the ECU 40 may cause the winding group of the second winding system to produce a torque that is approximately identical in magnitude to the limited torque produced by the winding group of the first winding system. When the winding groups of the two winding systems produce torques of the approximately same magnitude, fluctuation or torque ripple of a total torque produced by the motor 31 can be reduced. With the limitation imposed on the torque (amount of current) produced by the winding group of the first winding system, the winding group of the second winding system recovered to its normal state produces a torque (a torque limited to be lower than an initial torque). Accordingly, occurrence of an increase to an excessive value or a sudden change in the assist torque produced by the motor 31 can be reduced.

According to the embodiment, power supply to the winding groups (52 and 53) of the two winding systems is controlled independently. When the motor 31 includes winding groups each belonging to one of three or more winding groups, power supply to the winding groups of the three or more winding groups may be controlled independently. In this case, the ECU 40 transitions between a first state in which the ECU 40 causes the winding groups of the plurality of winding systems to produce the target assist torque and a second state in which one or more of the winding systems have failed and the ECU 40 causes the winding groups of the other one or more normal winding systems to produce the target assist torque. If a sum of current command values or a sum of actual current amounts of the normal winding systems is equal to or below the current threshold value $I_{th}$ when the failed one or more winding systems recover to the normal state in the second state, the ECU 40 transitions from the second state in which the motor 31 is driven by the winding groups of the normal winding systems other than the failed one or more winding systems to the first state in which the motor 31 is driven by the winding groups of all the winding systems. If the sum of the current command values or the sum of the actual current amounts of the normal winding systems is above the current threshold value $I_{th}$ when the failed one or more winding systems recover to its normal state in the second state, the ECU 40 is held in the second state as a standby state for transition from the second state to the first state. When the motor 31 includes winding groups of three or more winding groups, the ECU 40 may include individual control circuits, the number of the control circuits being the same as the number of the winding systems.

The embodiment describes an example in which an EPS that transmits a torque of the motor 31 to (the column shaft 22a of) the steering shaft 22 is employed as the EPS 10. Alternatively, an EPS that transmits a torque of the motor 31 to the rack shaft 23 may be employed as the EPS 10.

In the embodiment, the vehicle control apparatus is embodied as the ECU 40 that controls the motor 31 of the EPS 10. Alternatively, the vehicle control apparatus may be embodied as a control apparatus for a steer-by-wire steering system in which power transmission between the steering wheel 21 and the steered wheels 26 and 26 is separated. Such a steer-by-wire steering system typically includes a reactive motor that is a source of a steering reaction force applied to a steering shaft and a steering operation motor that is a source of a steering operation force that turns steered wheels. A motor including winding groups of a plurality of winding systems as in the embodiment is employed as each of the reactive motor and the steering operation motor. The control apparatus for the steer-by-wire steering system controls power supply to the winding groups of the plurality of winding systems of the reactive motor and the steering operation motor independently on a per-winding-system basis.

In the embodiment, the vehicle control apparatus is embodied as the ECU 40 that controls the motor 31 of the EPS 10. Alternatively, the vehicle control apparatus may be embodied as a control apparatus of a motor used in vehicle-mounted equipment other than a steering system, such as the EPS 10.

What is claimed is:

1. A vehicle control apparatus comprising:
a control circuit that independently controls power supply to winding groups, each of the winding groups belonging to one of a plurality of winding systems included in a motor, the control circuit including individual control circuits, a number of the control circuits being the same as a number of the plurality of winding systems, each of the individual control circuits independently controlling the power supply to a corresponding one of the winding groups of the plurality of winding systems, the control circuit independently controlling the power supply to the winding groups on a per-winding-system basis based on command values each calculated for a corresponding one of the winding systems in accordance with a target torque to be produced by the motor, wherein:
the control circuit is configured to transition between (i) a first state in which the control circuit causes the winding groups of the plurality of winding systems to produce the target torque, and (ii) a second state in which one or more winding systems of the plurality of winding systems have failed and the control circuit causes the winding group of the other one or more winding systems, which are normal winding systems that are operating normally, to produce the target torque,
when a sum of the command values or a sum of actual current amounts of the normal winding systems is equal to or less than a threshold value that is set with reference to zero or a value close to zero when the one or more winding systems recover to a normal state in the second state, the control circuit transitions from the second state to the first state,
the individual control circuits exchange state signals with one another, each of the state signals containing the command value calculated by a corresponding one of the individual control circuits, and
when the sum of the command values or the sum of the actual current amounts of the normal winding systems is above the threshold value when the one or more winding systems recover to the normal state in the second state, the control circuit is held in the second state as a standby state for transition from the second state to the first state.

2. The vehicle control apparatus according to, claim 1, wherein when production of a torque by the motor is required when the failed one or more winding systems recover to the normal state, the individual control circuits of the one or more winding systems recovered to the normal state cause the winding groups of the one or more winding systems recovered to the normal state to produce the torque, even when the individual control circuits of the one or more winding systems recovered to the normal state fail to obtain the state signals generated by the individual control circuits of the normal winding systems.

3. The vehicle control apparatus according to claim 1, wherein:
each of the individual control circuits has an overheat protection function that protects the respective winding group of the winding system to which the individual control circuit belongs from overheating, and
when a torque produced by each of the winding groups of the normal winding systems is limited to be lower than an initial torque by the overheat protection function performed by the individual control circuit of the normal winding system when the failed one or more winding systems recover to the normal state, each of the individual control circuits of the one or more winding systems recovered to the normal state causes the winding group of the winding system to which the individual control circuit belongs to produce a torque that is approximately identical in magnitude to the limited torque.

4. The vehicle control apparatus according to claim 1, wherein:
the motor produces a torque that is to be applied to a steering mechanism of a vehicle, and
the control circuit calculates the command values in accordance with the torque to be produced by the motor based on a steering torque.

* * * * *